United States Patent [19]
Conley

[11] 3,797,593
[45] Mar. 19, 1974

[54] HEAVY DUTY INDUSTRIAL SCALE

[75] Inventor: Fred Miller Conley, Highland, Calif.

[73] Assignee: Dudley & Conley Scale Co., Inc., Colton, Calif.

[22] Filed: Dec. 14, 1972

[21] Appl. No.: 315,214

[52] U.S. Cl............. 177/134, 177/132, 177/211, 177/256, 177/261
[51] Int. Cl............................................. G01g 19/02
[58] Field of Search ........... 177/132, 134, 136, 147, 177/211, 256–259, 261

[56] References Cited
UNITED STATES PATENTS

| | | | |
|---|---|---|---|
| 3,258,078 | 6/1966 | Crone et al. | 177/211 |
| 1,650,204 | 11/1927 | Gilbert | 177/257 |
| 3,158,217 | 11/1964 | Johnson | 177/134 |
| 1,268,197 | 6/1918 | Winslow | 177/134 |
| 971,758 | 10/1910 | Jones | 177/134 |
| 3,144,088 | 8/1964 | Kaplan | 177/147 |

Primary Examiner—Richard B. Wilkinson
Assistant Examiner—Vit W. Miska
Attorney, Agent, or Firm—Christie, Parker & Hale

[57] ABSTRACT

A weighbridge of a heavy duty industrial scale is supported by mounts which indicate applied load by a transducer which is loaded in pure tension. Each mount has a girder chair for supporting an I-beam. A pair of parallel arms extend from this girder chair downwardly to a first cross pin. The cross pin is force coupled to a link which in turn is force coupled to a clevis above the pin through a clevis pin. The pin coupling to the link and the link coupling to the clevis allows free rotational movement of each part with respect to the other. The clevis is tension coupled to the bottom of a load transducer. A similar series linkage is provided between the transducer and ground to complete force transmission to ground, except that this linkage is orthogonal to the first discribed linkage.

10 Claims, 3 Drawing Figures

PATENTED MAR 19 1974  3,797,593

HEAVY DUTY INDUSTRIAL SCALE

BACKGROUND OF THE INVENTION

The present invention relates to large industrial scales in general and, more in particular, to an industrial scale having a tension loaded transducer for generating an electrical signal which is a direct linear function of applied load.

Industrial scales for the weighing of large objects are common. Such scales are used to weigh, for example, trucks and locomotives to determine their payload.

A typical industrial scale of this type employs a massive weighing platform or weighbridge onto which a vehicle may be driven. The weighbridge is coupled to ground through mounts which transmit a signal of the load applied on them to some responsive instrument. Typically, there are several mounts to support a weighbridge and the sum of the loads on all of the mounts is indicated by the responsive instrument.

Today there are generally two types of industrial scales. One employs a transducer of a loaded beam and strain gauges to convert elastic strain of the beam into electrical signals which are proportional to load on the transducer. The other type of scale is purely mechanical.

One previously known mechanical system is adapted to avoid problems of side loading occasioned by the driving of a vehicle onto or off the weighbridge and has a parallel link suspension system.

A parallel link suspension system senses weight through a plurality of mounts, which through linkage turn a tube. The tube's displacement is translated into a weight measurement. Each of the mounts has a fulcrum pivot and a load pivot. The fulcrum pivot is defined by a knife edge and bearing block and serves to transmit the load on the mount to ground as well as allowing an arm of the mount to rotate under a load applied to it. The load pivot transfers the applied load to the fulcrum through motion isolating linkage. The motion isolating linkage allows the weighbridge two degrees of freedom in the horizontal and typically comprises a pair of parallel links and cross pins. A lower of these cross pins transfers applied load to the links to load the links in tension. The links are capable of rotating slightly with respect to this lower cross pin in response to horizontal displacements of the weighbridge. An upper cross pin is loaded by the links and it in turn loads the load pivot. The load pivot is a knife edge and bearing block and the bearing block is rigidly connected to the knife edge of the fulcrum pivot. Again, slight rotation is possible between the links and the upper pin to accommodate horizontal displacements. This mechanical system, then, provides a means to allow a weighbridge two degrees of horizontal freedom without affecting the accuracy of the scale.

When strain gauges are used in industrial scales, great care must be exercized to eliminate spurious signals coming from, for example, a vehicle driving onto the weighbridge. More particularly, strain gauges are accurate to reflect elastic strain along a predetermined axis of a transducer. When elastic strain occurs in a direction not along the predetermined axis from spurious signals the strain gauge is not very accurate. In application where total weight has to be summed from any transducers, linearity of each transducer's response is extremely important. When the total signal which indicates weight is the sum of signals from all the transducers and the response of each transducer to load is not linear, quite obviously different indicated weights are going to occur depending on where on the weighbridge a given vehicle with a given loading finds itself.

Previously known industrial scales which use strain gauges have attempted to load transducers in pure compression or in pure bending. Elaborate means were devised to insure only the desired type of loading and to guard rigorously against spurious loading.

In a compression loaded system the scale was made extremely rigid to prevent deflections and motions which would otherwise generate spurious signals from vehicle applied side loads on the weighbridge. Supporting I-beams were made very massive to avoid deflection in bending which would otherwise apply compression loads off the neutral axis of the load transducers, a component of which produces bending along the neutral axis. The weighbridge was prevented from having any substantial horizontal freedom to avoid bending loads on the transducers. The heavy construction and the requirement to make weighbridges rigid adds to the cost of the systems and is not always successful in avoiding the spurious signal problem.

One approach in overcoming the problems of spurious loading of load transducers and consequent error is to employ a plurality of cantilevered load beams. These beams are cantilevered from support piers and are loaded at one end, typically in tension, to cause them to bend. Bending deflection is sensed by a strain gauge and the strain gauge signal is converted into an indication of weight. The end of the load beam which is loaded is coupled to the loading platform as by a wire rope. The wire rope can yield sufficiently against horizontal forces to effectively isolate the load beams from these forces, which would otherwise cause spurious signals. One problem with the load beam approach is that it does not have practical applicability in large scale industrial scales for the load beam transducers become prohibitively large when made to withstand large loads. Moreover, the load beam transducers are relatively expensive and consequently if a large number of transducers were used to overcome the problem of massiveness, the approach would still be unattractive.

SUMMARY OF THE INVENTION

The present invention provides an improved industrial scale which is characterized in its facility to be made relatively light and simply while generating extremely accurate signals to indicate weight. The invention employs mounts which load the load indicating transducers in pure tension. The transducers generate electrical signals which are responsive to elastic strains of the transducers. The aggregate of the electric signals indicates the total load applied on the transducers and the weight of an object.

A general form of the present invention contemplates a weighbridge supported above ground by a plurality of mounts with each of the mounts having a load indicating transducer in tension mechanical series between ground and the weighbridge. The transducer is supported between means while yield to horizontal forces in either horizontal direction so that no bending or compressive forces from horizontal displacement of the weighbridge are felt by any of the transducers. More specifically, each load indicating transducer is vertically suspended by a first tension application means interposed in mechanical series between the transducer and ground. This first means is coupled to ground to yield to any horizontal force. A second tension application means similarly supports the load transducer in tension in series mechanical relationship between the transducer and the weighbridge. With both tension application means freely yielding to horizontal displacements, the load transducer may be moved off its vertical orientation of repose but will still read only pure tension loads, for only pure tension is applied to it. In short, the coupling of the load transducer in the mount is such that all spurious loads are prevented from reaching the transducer and causing error. Means with each of the transducers is also provided, such as a strain gauge, to generate an electrical signal which is directly in proportion to the elastic tensile deformation of the transducer.

A more specific form of the present invention contemplates a weighbridge suspended above a plurality of mounts. Each of the mounts is capable of transmitting a load on the weighbridge to ground through a purely tension indicating transducer while allowing the weighbridge 2° of horizontal freedom. The freedom accommodates disturbances such as a motor vehicle going onto or leaving the weighbridge. Each mount has a base which includes a pair of uprights. A cross pin is supported, as by cradling, in these uprights for the transmission of applied loads on the mount to the uprights and to ground. This first cross pin in turn supports means for applying a pure tension load on the transducer and to eliminate any other loads on the transducer. A similar means applies tension to the bottom of the transducer and is coupled to a second cross pin. The second cross pin in turn is load coupled to a pair of arms which depend from a girder chair or platform. The girder chair supports an I-beam of the weighbridge.

Preferably the means which apply pure tension loads to the transducer each comprises a link supported on its respective cross pins. A top one of the links is capable of limited rotation about the axis of its associated pin, or roll, yaw or turning about a vertical axis perpendicular to the axis of the pin, and pitch with respect to the horizontal axis of the pin. (As used herein the terms "roll," "yaw" and "pitch" have their standard dictionary meaning. "Roll" means to turn about an axis, in this case the lengthwise axis of the particular pin. "Yaw" is a turning motion about a vertical axis through the axis of the particular pin. Since the pins are all oriented in the horizontal, yaw would be in the horizontal plane. "Pitch" is motion of the axis of a pin in the vertical about a secondary axis in the horizontal which intersects the pin normal to that axis). A self-centering coupling of the link at its bottom to a clevis pin in a clevis and a tension coupling of the clevis to the transducer completes the tensile load coupling of the transducer to the weighbridge. The second portion of the tensile load coupling of the transducer to the weighbridge and serially to ground occurs with a linkage and clevis arrangement identical to that just described except that it is oriented at 90° thereto. The 90° orientation accommodates mounting of the cross pins to ground and the girder chair by vertical uprights and arms, respectively.

The industrial scale of the present invention through the gimble-like arrangement provides direct tension loading on a transducer. Tension loading of a transducer has many advantages. One of the advantages is that tension loaded transducers are highly linear. Consequently, the accuracy of the scale is very good, regardless of where load is applied on the weighbridge. A second advantage of the present system is that the transducers are considerably smaller than the cantilevered load beam type transducers previously suggested.

The mount of the present invention is capable of considerable movement under horizontal loads applied to the weighbridge without affecting at all the accuracy of the load indicated by its transducer because the transducer is always loaded in tension. Stated alternatively, the mount eliminates spurious loads and allows considerable horizontal motion in doing so. Because of this, the large I-beams, or, more generally, the very large and rigid structure of the weighbridge required with compression loaded transducers is obviated. Moreover, the mount rights itself by gravity return in the vertical after disturbing forces are dissipated.

These and other features, aspects and advantages of the present invention will become more apparent from the following description, appended claims and drawings.

DESCRIPTION OF THE PREFERRED EMBODIMENT

Figure 1:
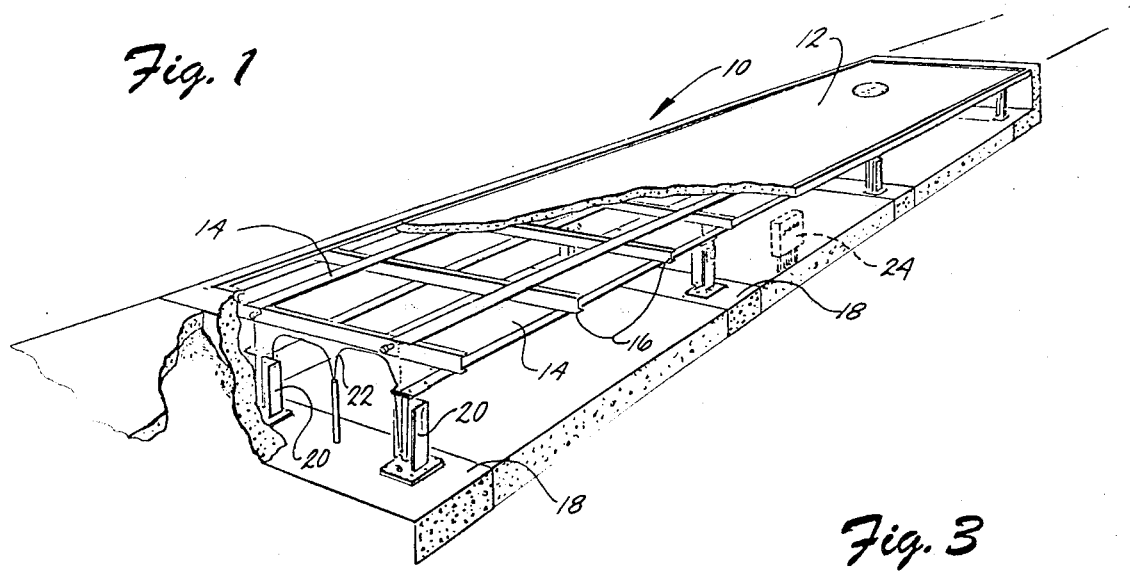
FIG. 1 is a perspective view, partly broken away, of an industrial scale in accordance with the preferred embodiment of the present invention.

With reference to FIG. 1, a heavy duty industrial scale 10 is illustrated. In general the scale has a large massive platform or weighbridge 12 onto which a vehicle, such as a heavy truck, can drive for purposes of weighing the vehicle and its load. The weighbridge has longitudinal, parallel and spaced-apart I-beams 14 which extend in effect the entire length of the bridge. Cross channels 16 are provided at regular intervals for purpose of transmitting load to the longitudinal I-beams. The longitudinal I-beams are supported above a foundation of piers 18 by a plurality of mounts 20. That is, the weight of the weighbridge and any object on it is borne entirely by the mounts. Each of the mounts is identical. In the illustrated embodiment there is a total of eight mounts. Each mount is capable of generating an electrical signal in response to the load applied on it. These signals are sent through conductors 22 to a totalizer 24 where weight is shown. The totalizer is well known. As is also well known, the foundation or piers are massive and may be of concrete. Except for the weighbridge, the balance of the scale is typically disposed in a pit.

Figures 2, 3:
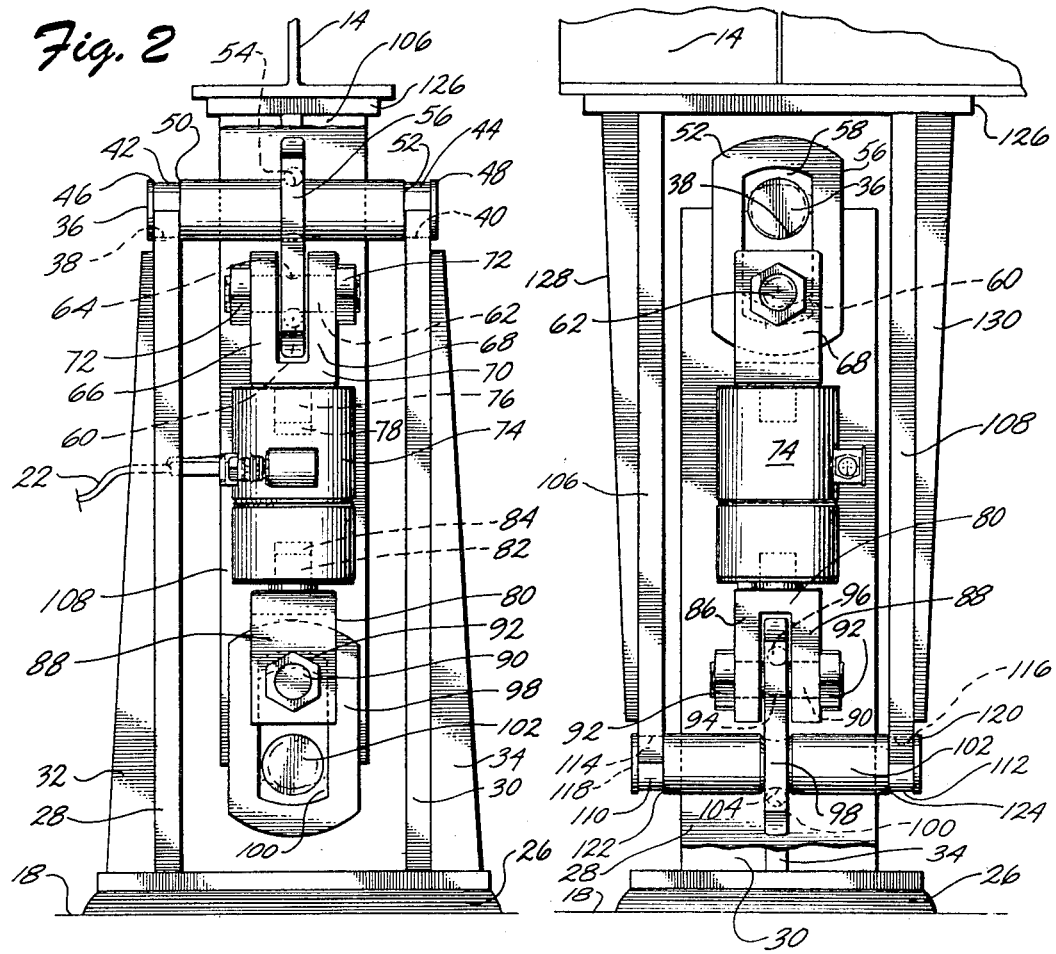
FIG. 2 is an end elevational view of a mount of the industrial scale of the present invention.
FIG. 3 is a side elevational view of the mount shown in FIG. 2.

With reference to FIGS. 2 and 3, the mounts of the present invention are illustrated in detail. Since the mounts are identical the description will be of a single mount.

The mount illustrated in FIGS. 2 and 3 has a base 26 which is rigidly secured to one of the piers 18, as by bolts, for transmission of a portion of the scale's load to ground. A pair of spaced-apart uprights 28 and 30 extend vertically from the base and are rigidly attached to the base as by welding. These uprights may be steel plates. Reinforcing gussets 32 and 34 are welded to uprights 28 and 30, respectively, and to the base to make the uprights more rigid.

A first cross pin 36 is cradled in a pair of half-moon cutouts 38 and 40 in uprights 28 and 30, respectively, the shape of these cutouts being shown to best effect in FIG. 3 for cutout 38. Cross pin 36 is cylindrical and has cylindrical bearing surfaces 42 and 44 which provide the actual bearing in the half-moon cutouts of the uprights. These annular surfaces are bounded at their ends by larger diameter flanges 46 and 48 and on their insides by shoulders 50 and 52. Pin 36 is incapable of any translatory motion because it is prevented from doing so by the flanges and the shoulders. With wear, the pin can be rotated.

An annular groove 54 is provided in the middle of pin 36. This annular groove is semicircular in cross section and is symmetrical about a plane perpendicular to the axis of the pin. The groove centers an assembly received in it and suspended from the cross pin midway between uprights 28 and 30. With reference to FIG. 3, the assembly includes a link 56 captively retained on cross pin 36 and which has a hardened bearing insert 58. The bearing insert is radiused, in cross section, to conform to the curvature of semicircular groove 54. The bearing insert is also curved concave downwardly in a plane perpendicular to the axis of the cross pin, in the plane of the link, with the center of this curvature located along the longitudinal axis of the device. This latter curvature as well as its radiused curvature tends to align the link along the longitudinal axis of the device, the vertical repose orientation illustrated.

At the bottom of the link a similar arrangement is found except that it is symmetrical with the top of the link about a bisecting horizontal line through the link. Thus a hardened insert 60 is radiused along its length and also has a curvature in the plane of the link which is concave upward with the center of curvature falling on the longitudinal axis of the mount. The hardened insert supports a cylindrical clevis pin 62. Clevis pin 62 has an annular, semicircular cross sectioned groove 64 bearing on the lower hardened insert of the link. The groove centers an assembly carried by the clevis pin. Stated differently, the curvature of the lower bearing insert of the link in the plane of the link and its radiused curvature cooperate with the groove in the clevis pin to align the device along its longitudinal axis of repose. Thus link 56 carries clevis pin 62 in a manner permitting misalignment between the link and the pin without loading the link in anything but tension and the link and pin seek the position illustrated.

The clevis pin extends through a pair of legs 66 and 68 of a clevis 70. These legs straddle and are spaced from the lower portion of link 56. The pin is secured in the clevis legs as through nuts 72 on threaded ends of the pin. The link is therefore captively coupled to the clevis. The clevis itself is secured to a load transducer 74 as by a threaded shaft 76 threaded into threads of a recess 78 of the load transducer.

The bottom of the load transducer is tension coupled to the balance of the mount in a manner quite similar to that just described for the top of the transducer except that the complementary linkage is orthogonally oriented with respect to the linkage constituted of cross pin 36, link 56, clevis pin 62 and clevis 70.

Thus a clevis 80 has a threaded shaft 82 threaded into threads of a recess 84 of transducer 74. The clevis has a pair of parallel, spaced-apart legs 86 and 88 which mount a clevis pin 90. Clevis pin 90 is secured in the clevis as by nuts 92 threaded onto threads at the ends of the clevis. Clevis pin 90 also has an annular centering groove 94 with a semicircular cross section which provides a bearing surface for a radiused and hardened insert 96 of a lower link 98. Hardened insert 96 is radiused to conform to the radius of annular groove 94 and, in addition, it is concave upwardly curved to provide a self-centering feature. As in the hardened inserts of link 56, the apex of this centering curvature is at the center of the link. A second hardened insert 100 is disposed at the bottom of link 98 and is similarly radiused to conform to the radius of an annular groove with a circular cross section and it also has a self-centering concave upward curve in the plane of the link.

A second cross pin 102 disposed at right angles to cross pin 36 has an annular centering groove 104 with a semicircular cross section. This annular groove receives insert 100 of link 98 for load coupling the link and cross pin. The purpose of groove 104 is to center link 98 midway between a pair of legs 106 and 108. Cross pin 102 has a pair of annular bearing surfaces 110 and 112 which provide bearing for depending legs 106 and 108. Depending legs 106 and 108 each has a half-moon cutout 114 and 116, respectively, which are received on surfaces 110 and 112, respectively. A pair of annular flanges 118 and 120 at the ends of the bearing surfaces and shoulders 122 and 124 on the interior ends of these surfaces prevent translation of the cross pin with respect to the depending legs. Legs 106 and 108 depend from a girder chair 126. They are typically secured to the girder chair as by welding. Gussets 128 and 130 stiffen the depending legs. I-beam girder 14 is secured to girder chair 126 as by bolts.

Transducer 74 includes strain gauges arrayed in a well known manner on a calibrated member which actually takes the tensile load and is elastically strained, with strain signals sent through electrical conductors 22 to totalizer 24.

It should be obvious that the mount of the present invention can accommodate a considerable amount of horizontal displacement of the weighbridge while at the same time always loading the load transducer in tension. The mount also effects self-centering so that after disturbing loads are removed the mount returns to the orientation illustrated in the Figures. More specifically the series tension coupling of the transducer between ground and the weighbridge through a linkage system wherein all but tension loads are effectively isolated from the transducer is effected by providing both degrees of horizontal freedom for the mount, for example, link 98 and pin 102. The link can pitch, yaw and roll with respect to the axis of the cross pin. Roll and some pitch and yaw can occur between the link and the clevis cross pin.

In operation, let it be supposed that a truck drives onto weighbridge 12 and imposes a horizontal force on it in the direction of the weighbridge's longitudinal axis. This will create a condition, with reference to FIG. 3, wherein lower cross pin 102 will tend to pendulously oscillate about the axis of the mount in repose. These pendulous oscillations are accommodated by the coupling of link 98 to clevis 80 so that the link oscillates with the pin, with oscillations that have been dampened somewhat. The load transducer will also oscillate and its top support will oscillate with the weighbridge. Quite obviously loads applied in the opposite direction will produce the same result as can readily be seen with the benefit of this explanation for FIG. 2.

The present invention has been described with reference to a certain preferred embodiment. The spirit and scope of the appended claims should not, however, necessarily be limited to the foregoing description.

What is claimed is:

1. In combination with a heavy duty industrial scale of the type having a weighbridge supported by a plurality of load indicating mounts, and means responsive to signals from all the mounts to indicate the weight of an object, an improvement in each of the mounts which comprises:
   a. a tension indicating transducer having a vertical tensile axis;
   b. a girder chair for supporting the weighbridge and depending therefrom;
   c. a cross pin nontranslationally and horizontally secured to the girder chair below the tension indicating transducer;
   d. a link having a hole therethrough, the link being received by the cross pin for bearing engagement between the two between a surface of the periphery of the hole of the link and a surface of the cross pin, the bearing engagement yielding to horizontal forces transverse to the tensile axis;
   e. a clevis;
   f. a clevis pin horizontally secured to the clevis, the link being captively suspended by the clevis pin below the pin and being in bearing engagement therewith with a surface on the periphery of the hole of the link bearing on a surface of the pin, the bearing engagement freely to all horizontal forces transverse to the tensile axis;
   g. the tension indicating transducer being above the clevis and being secured to the clevis along the tensile axis; and
   h. means mechanically coupling the transducer in series force relationship to ground, such means yielding to horizontal forces transverse to the tensile axis and being operable to load the transducer only in tension.

2. The improvement claimed in claim 1 wherein: the cross pin has an annular, external groove in a plane perpendicular to the axis thereof, the surface of the link in bearing with the cross pin bearing on the surface of the groove; and
   the clevis pin has an annular groove perpendicular to the axis thereof, the surface of the link in bearing with the pin being in the annular groove of the pin and bearing on the surface thereof.

3. The improvement claimed in claim 2 wherein the girder chair has a pair of spaced apart and vertical legs, the cross pin being secured to the legs between them.

4. The improvement claimed in claim 3 wherein the clevis has a pair of spaced apart arms, the clevis pin being secured to the clevis between the arms.

5. An improved heavy duty industrial scale comprising:
   a. a weighbridge for receiving an object to be weighed;
   b. a plurality of mounts supporting the weighbridge, each mount comprising:
      i. a base on the ground;
      ii. a pair of spaced-apart uprights secured to and extending vertically from the base, each upright having a half-moon cutout horizontally and axially aligned with the cutout of the other upright;
      iii. a first cross pin nontranslationally cradled in the half-moon cutouts, the first pin having an annular groove between the uprights in a vertical plane;
      iv. a first link captively suspended on the first cross pin and having an upper bearing surface in the groove of the first cross pin, the upper bearing surface being radiused and curved concave downwardly to cooperate with the groove and permit rotation of the link in yaw, pitch and roll with respect to the axis of the pin and align the link along a predetermined vertical axis of repose, the first link also having a lower bearing surface symmetrical with the first bearing surface about an imaginary horizontal line midway between the bearing surfaces;
      v. a clevis having a pair of vertical, upwardly extending and spaced-apart arms,
      vi. a horizontal clevis pin secured in the clevis arms and captively suspended by the first link, the clevis pin having a vertical annular groove between the clevis arms in a plane perpendicular to the axis of the clevis pin and in receipt of the lower bearing surface to permit yaw, pitch and roll of the link with respect to the axis of the clevis pin and align the link along the predetermined vertical axis of repose,
      vii. a transducer suspended by the clevis and being capable of generating a signal proportional to elastic tensile strain thereon,
      viii. a second clevis suspended from the transducer and having a pair of vertical, downwardly extending and spaced-apart arms,
      ix. a second horizontal clevis pin secured in the second clevis arms and having an annular groove between the clevis arms in a vertical plane,
      x. a second link captively suspended by the second clevis pin and having a radiused and concave downwardly upper bearing surface in the groove of the second clevis pin to cooperate with such groove and permit yaw, pitch and roll of the link with respect to the axis of the second clevis pin and align the link along the predetermined vertical axis of repose, the second link also having a lower bearing surface symmetrical with its first bearing surface about an imaginary horizontal line midway between the bearing surfaces of the second link,
      xi. a girder chair supporting the weighbridge;
      xii. a pair of spaced-apart vertical legs attached to and depending from the girder chair, each leg having a half-moon cutout horizontally and axially aligned with the cutout of the other leg,
      xiii. a second cross pin nontranslationally received in the half-moon cutouts of the legs, the second cross pin having an annular groove between the legs in a vertical plane, and
      xiv. the lower bearing surface of the second link being received in the annular groove of the second cross pin and cooperating with such groove to permit rotation of the second link in roll, yaw and pitch with respect to the axis of the second cross pin and align the second link along the predetermined axis of repose, and
   c. means responsive to the total of all signals from the transducers to indicate weight.

6. In combination with a heavy duty industrial scale of the type having a weighbridge supported by a plurality of load indicating mounts, and means responsive to signals from all the mounts to indicate the weight of an object, an improvement in each of the mounts which comprises:
 a. a base on the ground;
 b. an upright secured to and extending vertically from the base;
 c. a first cross pin horizontally secured to the upright;
 d. a first link captively suspended by the first cross pin and having a hollow interior, an upper bearing surface on a portion of the periphery bounding the hollow interior, and a lower bearing surface on a portion of the periphery bounding the hollow interior, the upper bearing surface being in bearing engagement with a surface of the first cross pin to yield to forces on the link;
 e. a first clevis;
 f. a first clevis pin horizontally and captively secured to the clevis, the lower bearing surface of the link being in bearing engagement with a surface of the clevis pin to yield to horizontal forces, the first link being captively retained by the first clevis and first clevis pin;
 g. a tension indicating transducer having a tensile axis and being capable of generating a signal proportional to the elastic tensile stress thereon, the transducer being secured to the clevis below the clevis such that force applied by the clevis on the transducer is only along the tensile axis;
 h. a second clevis secured to the transducer to apply a force thereon only along the tensile axis;
 i. a second clevis pin horizontally and captively secured to the second clevis;
 j. a second link having a hollow interior, a lower bearing surface on a portion of the periphery of the hollow interior, and an upper bearing surface on a portion of the periphery of the hollow interior, the lower bearing surface being in bearing engagement with a surface of the second clevis pin to yield to horizontal forces on the link, the second link being captively retained by the second clevis and second clevis pin;
 k. a second cross pin having a horizontal axis, the second link being captively secured to the second cross pin with the upper bearing surface of the link in bearing engagement with a surface of the cross pin to yield to horizontal forces on the link; and
 l. a girder chair depending from the weighbridge and securing the second cross pin with the axis thereof orthogonal to the axis of the first cross pin.

7. The improvement claimed in claim 6 wherein:
 the first clevis and the second clevis each has a pair of spaced apart arms, the first and second clevis pins being secured to the arms of the first clevis and second clevis, respectively;
 a second upright spaced from the first upright is included, the first cross pin being secured to both uprights between them; and
 the girder chair has a pair of spaced apart vertical legs, the second cross pin being secured to both vertical legs between them.

8. The improvement claimed in claim 7 wherein the axes of the first and second cross pins are disposed orthogonally with respect to each other.

9. The improvement claimed in claim 8 wherein:
 the bearing surfaces of the links are convex in a direction transverse to the plane of the links;
 the clevis pins and cross pins each has an annular groove in a plane perpendicular to its axis, each of the bearing surfaces of the links being received in the annular groove of the pin with which it is in bearing relation.

10. The improvement claimed in claim 9 wherein each of the bearing surfaces of the links in the plane of its link is concave facing the interior of the link.

* * * * *

PO-1050
(5/69)

UNITED STATES PATENT OFFICE
CERTIFICATE OF CORRECTION

Patent No. __3,797,593__  Dated __March 19, 1974__

Inventor(s) __Fred Miller Conley__

It is certified that error appears in the above-identified patent and that said Letters Patent are hereby corrected as shown below:

In the specification: Column 2, line 62, "while" should be --which--. Column 7, line 33, delete "freely to all" and insert therefor --yielding to--.

In the claims: Claim 6, column 9, line 16, before "forces" insert --horizontal--.

Signed and sealed this 5th day of November 1974.

(SEAL)
Attest:

McCOY M. GIBSON JR.
Attesting Officer

C. MARSHALL DANN
Commissioner of Patents